United States Patent [19]

Romer

[11] Patent Number: 5,588,640
[45] Date of Patent: Dec. 31, 1996

[54] AIR-SPRING LEG WITH A PRESSURE CHAMBER FOR MOTOR VEHICLES

[75] Inventor: Matthias Romer, Weinstadt, Germany

[73] Assignee: Mercedes-Benz AG, Stuttgart, Germany

[21] Appl. No.: 544,005

[22] Filed: Oct. 17, 1995

[30] Foreign Application Priority Data

Oct. 26, 1994 [DE] Germany ............... 44 38 192.1

[51] Int. Cl.⁶ ............... F16F 9/02; F16K 17/04; B60G 11/27; B60G 17/04
[52] U.S. Cl. ............... 267/64.11; 137/493; 137/853; 267/122; 267/64.28
[58] Field of Search ............... 267/64.28, 122, 267/64.11, 140.11–140.15, 64.12–64.27, DIG. 1, DIG. 2; 188/298; 137/493, 493.8, 853; 280/714, DIG. 1, 711

[56] References Cited

U.S. PATENT DOCUMENTS

| | | | |
|---|---|---|---|
| 1,596,444 | 8/1926 | Morinelli | 267/64.28 |
| 2,107,596 | 2/1938 | Bourdon | 137/493 X |
| 2,136,038 | 11/1938 | Bourdon | 137/853 X |
| 2,141,507 | 12/1938 | Bourdon | 137/853 X |
| 2,988,103 | 6/1961 | Canvasser | 137/853 X |
| 3,186,730 | 6/1965 | Angell . | |
| 3,298,391 | 1/1967 | Savage | 137/493 |
| 3,445,085 | 5/1969 | Eckel et al. . | |
| 3,519,011 | 7/1970 | Pennanen | 267/64.28 |
| 3,620,248 | 11/1971 | Cary | 137/493 |
| 3,790,147 | 2/1974 | Owen | 267/64.21 |
| 3,792,720 | 2/1974 | Robbins . | |
| 3,826,507 | 7/1974 | Brand et al. | 267/35 X |
| 3,904,181 | 9/1975 | Harsy-Vadas | 267/35 |
| 4,134,424 | 1/1979 | Zeyra et al. . | |
| 4,257,580 | 3/1981 | Schnitzius | 267/64.28 |
| 4,360,191 | 11/1982 | Urushihama . | |
| 4,568,333 | 2/1986 | Sawyer et al. | 137/493 X |
| 4,664,161 | 5/1987 | Starr | 267/64.28 |
| 4,669,710 | 6/1987 | Horvat | 267/122 |
| 4,690,388 | 9/1987 | Harrison | 267/35 |
| 4,813,655 | 3/1989 | Hennells | 267/64.28 |
| 5,036,879 | 8/1991 | Ponci | 137/853 X |
| 5,188,140 | 2/1993 | Kosaka . | |

FOREIGN PATENT DOCUMENTS

| | | | |
|---|---|---|---|
| 0253064A2 | 1/1988 | European Pat. Off. . | |
| 0509851 | 10/1992 | European Pat. Off. | 267/64.28 |
| 1228552 | 8/1960 | France . | |
| 2365157 | 4/1978 | France . | |
| 3805575A1 | 9/1988 | Germany . | |
| 9306799 U | 9/1993 | Germany . | |
| 5950241 | 3/1984 | Japan | 267/64.28 |
| 7903502 | 11/1980 | Netherlands . | |
| 445643 | 4/1936 | United Kingdom . | |
| 747899 | 4/1956 | United Kingdom . | |
| 824371 | 11/1959 | United Kingdom . | |
| 880074 | 10/1961 | United Kingdom . | |
| 1206721 | 9/1970 | United Kingdom . | |
| 9519520 | 1/1996 | United Kingdom . | |

*Primary Examiner*—Douglas C. Butler
*Attorney, Agent, or Firm*—Evenson, McKeown, Edwards & Lenahan, P.L.L.C.

[57] ABSTRACT

In air-spring legs with a pressure chamber in each case for motor vehicles, in which the respective pressure chamber can be subjected to different pressures via a connector leading to the outside, a minimum pressure is to be ensured in the respective pressure chamber irrespective of external influences. This minimum pressure is also to be present in the case of a demounted or not yet mounted spring leg in the pressure chamber thereof. For this purpose, the connector of the pressure chamber of the air-spring leg has in each case an automatically operating pressure relief valve which can be designed to maintain a minimum pressure which can be predetermined for the chamber, and by means of which pressure relief valve the connector is open at a pressure which is acting from the interior of the pressure chamber or from the outside and is above the minimum pressure and, at a pressure below it, is closed. The closure element of the pressure relief valve is, in particular, a tubular elastomer which is pulled onto a cylindrical basic body and by means of which bores running through the basic body are separated from one another or connected to one another in terms of flow.

13 Claims, 1 Drawing Sheet

AIR-SPRING LEG WITH A PRESSURE CHAMBER FOR MOTOR VEHICLES

BACKGROUND AND SUMMARY OF THE INVENTION

The invention relates to an air-spring leg with a pressure chamber for motor vehicles, in which the pressure chamber can be subjected to different pressure via a connector leading to the outside.

In such an air-spring leg, a specific minimum pressure is to be maintained in the pressure chamber irrespective of any intentional or unintentional influences from the outside which may take effect in the chamber via a connection opening. Unintentional influences from the outside may occur, for example, due to system errors which may be triggered by defects in the valve or line or by faults in the electronic control system. In these cases, a certain emergency running capability of the vehicle is to be preserved by maintaining a minimum pressure. The desired minimum pressure is to be guaranteed on each spring leg of a vehicle.

A minimum pressure is also desirable in order, in cases in which the pressure chamber is formed by a spring bellows, to avoid damage to the air-spring bellows which could occur in an unpressurized state with specific, in particular single-layer, air-spring bellows with guidance at the outside.

The assurance of a minimum pressure is to be possible separately for each air-spring leg.

An object of the invention is to provide a functionally reliable and economically implementable solution to the objectives mentioned above. This object is achieved utilizing preferred embodiments of the invention wherein an automatically operating pressure relief valve is provided in the connector for maintaining a minimum pressure which can be predetermined for the pressure chamber, and wherein said pressure relief valve opens at a pressure which is acting from the interior of the pressure chamber or from the outside and is above the minimum pressure and closes at a pressure below the minimum pressure.

The pressure relief device provided according to the invention in the connector of each air-spring leg can basically be implemented in principle using pressure relief valves which are known per se. Embodiments, which can be produced in a particularly simple manner and act reliably, of a pressure relief valve which can be used for the purpose according to the invention are described in greater detail below with reference to an exemplary embodiment.

The provision according to the invention of the pressure chamber of each air-spring leg with a pressure relief valve directly in the pressure-chamber connector already allows the pressure chamber to be filled up to a predeterminable minimum pressure during the production of the compression-spring leg. The tightness of the pressure chamber can thereby be checked even before mounting of the spring legs on the vehicle. This is because, if there were any leakiness present, it would be possible to establish this by a lack of minimum pressure in the pressure chamber.

Other objects, advantages and novel features of the present invention will become apparent from the following detailed description of the invention when considered in conjunction with the accompanying drawings.

DETAILED DESCRIPTION OF THE DRAWINGS

Figure 1:
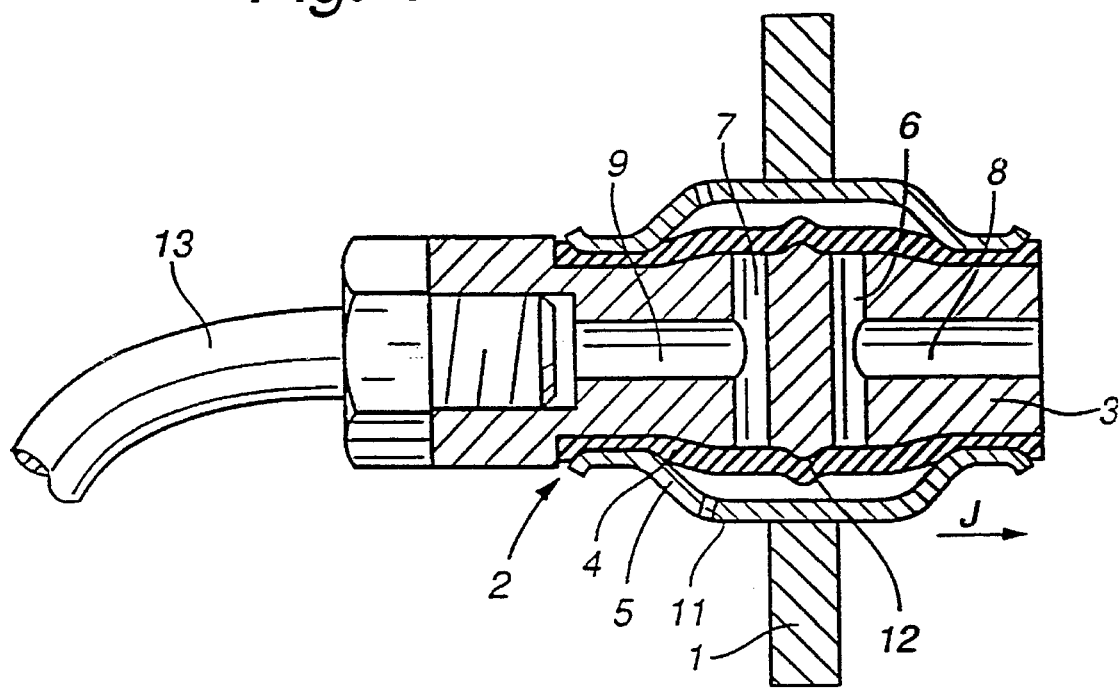
FIG. 1 shows a longitudinal section through an installed connector in the shut-off state constructed according to a preferred embodiment of the invention.
Figure 2:
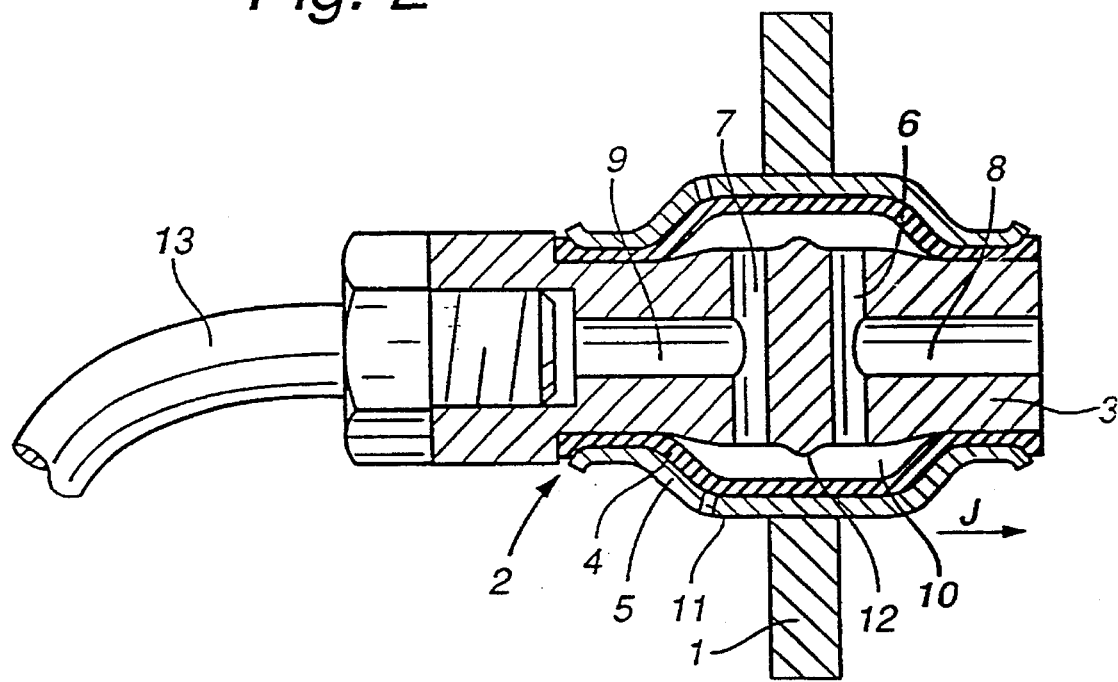
FIG. 2 shows the connector according to FIG. 1 in the same manner of illustration in the open state

A connector 2 is provided in an outer wall 1 of the pressure chamber of an air-spring leg.

By means of an arrow denoted J, it is specified in the drawing on which side of the outer wall 1 the closed interior of the pressure chamber is located. Atmospheric pressure prevails on the other side of the outer wall 1.

The connector 2 comprises a cylindrical basic body 3, a tubular elastomer 4 pulled over the basic body, and an annular enveloping wall 5, by means of which the elastomer is pressed tightly onto the basic body 1 in axially spaced-apart regions. In the region located axially between the pressing points, the enveloping wall 5 extends at such a distance from the outer circumference of the basic body 3 that the tubular elastomer 4 can move radially in the region located between the enveloping wall and the basic body.

Provided in the basic body 3, in that region in which the elastomer 4 can move radially, are two transverse bores 6 and 7 which, in the present case, are through-bores. From the interior of the pressure chamber and from the outside, respective longitudinal bores 8 and 9 meet with the transverse bores 6 and 7.

The tubular elastomer 4 rests with such a prestress on the cylindrical basic body 3 that it reliably prevents a flow connection between these two longitudinal bores 8 and 9 until a predetermined minimum pressure is present which can be exerted via one of the longitudinal bores 8 or 9. If the pressure rises above the predetermined minimum pressure value from one of the two longitudinal bores 8 or 9, the elastomer 4 lifts off radially from the cylindrical basic body and thus exposes a flow connection between the longitudinal bores 8 and 9 via the transverse bores 6 and 7 and a connection space 10 provided by the lifted-off elastomer 4. In the case of high pressure within the connection space 10, the tubular elastomer 4 can bear in a supporting manner against the enveloping wall 5. To avoid a counter-pressure between the tubular elastomer 4 and the enveloping wall 5, a compensation opening 11 is provided in the said enveloping wall towards the atmosphere.

An annularly extending sealing edge 12 is formed between the transverse bores 6 and 7 to achieve a good sealing effect of the elastomer 4 on the outer circumference of the cylindrical basic body 3.

In practice, the pressure relief valve functions in the device described above as follows.

If, for example, air is introduced from outside into the longitudinal bore 9 at a pressure which is above the predetermined minimum pressure which is to be ensured in the pressure chamber, the elastomer 4 releases the passage into the interior of the pressure chamber via the bores 6 and 8 by lifting off from the cylindrical basic body. As long as pressure above the minimum pressure prevails in the pressure chamber, air can escape in the opposite direction from the chamber from the chamber through the connector 2.

The connector 2 can be inserted in a simple manner into an opening in the outer wall 1 of the pressure chamber of a spring leg and can easily be connected tightly in a conventional manner to the said outer wall 1. In this case, it is also possible, inter alia, to screw the connector into the outer wall 1. Furthermore, additional annular brackets can be used for the connection.

The end of the connector located outside the pressure chamber is expediently provided with a screw connection for screwing on a connection line 13.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Air-spring leg of a spring bellows-type with a pressure chamber, having an interior and an exterior, for motor vehicles, in which the pressure chamber can be subjected to different pressures via a connector, arranged in a wall of the pressure chamber, leading to the exterior, wherein an automatically operating pressure relief valve is provided in the connector for maintaining a minimum pressure which can be predetermined for the pressure chamber;

wherein said pressure relief valve opens at a pressure which is acting from the interior of the pressure chamber or from the exterior and is above the minimum pressure and closes at a pressure below the minimum pressure; and wherein the flow path leading through the connector passes through a connection space which is located within the pressure relief valve, and wherein an elastomer is movably arranged in the pressure relief valve dependent on the pressure in the connection space, to prevent a throughflow of the connection space at a pressure prevailing there below the minimum pressure and to permit such throughflow at a pressure above the minimum pressure, the elastomer being prestressed to achieve flow prevention.

2. The airspring leg according to claim 1, wherein the elastomer forms a part of the outer wall of the connection space.

3. The airspring leg according to claim 2, wherein an enveloping wall is provided to support the elastomer at a pressure above the minimum pressure.

4. The airspring leg according to claim 1, wherein an enveloping wall is provided to support the elastomer at a pressure above the minimum pressure.

5. The airspring leg according to claim 4, wherein the pressure relief valve has a cylindrical basic body with transverse bores which are located adjacent to one another, lead from the basic body into the connection space, emerge in each case via a longitudinal bore adjoining said transverse bores in each case in an opposite axial end of the basic body, and can be separated from one another within the connection space by the elastomer.

6. The airspring leg according to claim 5, wherein the elastomer is of tubular design and is pulled onto the cylindrical basic body.

7. The airspring leg according to claim 5, wherein in an outer region of the cylindrical basic body located axially between the openings of the transverse bores, a sealing edge extending annularly over the outer circumference of said basic body ensures a tight fitting of the elastomer at a pressure below the minimum pressure.

8. The airspring leg according to claim 1, wherein the pressure relief valve has a cylindrical basic body, and wherein a connection for a screw closure or a quick-acting closure is present at least at one axial end of the cylindrical basic body for a connection line to be connected to the opening of the basic body located at that point.

9. The airspring leg according to claim 1, wherein the said pressure relief valve has a cylindrical basic body with transverse bores which are located adjacent to one another, lead from the basic body into the connection space, emerge in each case via a longitudinal bore adjoining said transverse bores in each case in an opposite axial end of the basic body, and can be separated from one another within the connection space by the elastomer.

10. The airspring leg according to claim 9, wherein a connection for a screw closure or a quick-acting closure is present at least at one axial end of the cylindrical basic body for a connection line to be connected to the opening of the basic body located at that point.

11. The airspring leg according to claim 1, wherein the pressure relief valve has a cylindrical basic body with transverse bores which are located adjacent to one another, lead from the basic body into the connection space, emerge in each case via a longitudinal bore adjoining said transverse bores in each case in an opposite axial end of the basic body, and can be separated from one another within the connection space by the elastomer.

12. The airspring leg according to claim 11, wherein the elastomer is of tubular design and is pulled onto the cylindrical basic body.

13. The airspring leg according to claim 11, wherein in an outer region of the cylindrical basic body located axially between the openings of the transverse bores, a sealing edge extending annularly over the outer circumference of said basic body ensures a tight fitting of the elastomer at a pressure below the minimum pressure.

* * * * *

UNITED STATES PATENT AND TRADEMARK OFFICE
CERTIFICATE OF CORRECTION

PATENT NO.   : 5,588,640
DATED        : December 31, 1996
INVENTOR(S)  : Matthias RÖMER It is certified that error appears in the above-indentified patent and that said Letters Patent is hereby corrected as shown below:

```
         On the title page: Item [75]

change the inventor's last name from

"ROMER" to --RÖMER--.
```

Signed and Sealed this

Third Day of February, 1998

Attest:

BRUCE LEHMAN

*Attesting Officer*   *Commissioner of Patents and Trademarks*